United States Patent [19]

Ackerman

[11] Patent Number: 5,313,722
[45] Date of Patent: May 24, 1994

[54] WOMAN'S CALENDAR

[76] Inventor: Susan Ackerman, 10211 Green Holly Ter., Silver Spring, Md. 20902

[21] Appl. No.: 742,341

[22] Filed: Aug. 8, 1991

[51] Int. Cl.⁵ .............................................. G09D 3/04
[52] U.S. Cl. ....................................... 40/110; 40/597; 283/4
[58] Field of Search ................. 40/107, 110, 600, 597, 40/621; 283/2, 3, 4, 116

[56] References Cited

U.S. PATENT DOCUMENTS

| | | | |
|---|---|---|---|
| 1,470,065 | 10/1923 | Downer . | |
| 1,520,648 | 12/1924 | Holt | 283/2 X |
| 2,025,636 | 12/1934 | Block | 40/109 |
| 2,096,248 | 10/1937 | Huston | 40/68 |
| 2,134,928 | 11/1938 | Rahn | 40/110 X |
| 2,215,020 | 9/1940 | Sow | 40/111 |
| 2,431,827 | 12/1947 | Rado | 40/110 X |
| 2,789,763 | 4/1957 | Renaudin | 235/89 |
| 2,868,293 | 1/1959 | Kearse | 40/107 X |
| 3,001,308 | 9/1961 | Potter | 40/110 |
| 3,709,430 | 1/1973 | Matthews | 235/109 |
| 3,838,530 | 10/1974 | Schelling, Jr. | 40/107 |
| 3,909,968 | 10/1975 | Bolstad | 40/110 X |
| 3,964,195 | 6/1976 | Jordan | 283/2 X |
| 3,975,848 | 8/1976 | Schmid | 40/110 |
| 4,131,790 | 12/1978 | Rebsch | 235/89 R |
| 4,171,584 | 10/1979 | Kaiser | 40/597 X |
| 4,381,121 | 4/1983 | Hanley | 283/1 A |
| 4,472,893 | 9/1984 | Curti | 283/2 X |
| 4,472,894 | 9/1984 | Wightman | 40/110 X |
| 4,584,218 | 4/1986 | Travis | 40/594 X |
| 4,614,360 | 9/1986 | Sheehan et al. | 40/110 X |
| 4,793,634 | 12/1988 | Alloggiamento | 283/2 |
| 4,852,282 | 8/1989 | Selman | 40/600 X |

FOREIGN PATENT DOCUMENTS

| | | | |
|---|---|---|---|
| 187722 | 11/1936 | Switzerland | 40/107 |
| 566608 | 9/1975 | Switzerland | 40/110 |
| 247119 | 2/1926 | United Kingdom | 40/110 |
| 255699 | 7/1926 | United Kingdom | 40/110 |

*Primary Examiner*—Kenneth J. Dorner
*Assistant Examiner*—Milton Nelson, Jr.
*Attorney, Agent, or Firm*—Shoemaker and Mattare Ltd.

[57] ABSTRACT

A woman's calendar comprises a markable, erasable surface delineated into an array of boxes representing the months and days of the calendar year, and a marker or markers for representing periodic events of interest on the day of their actual or anticipated occurrence. Events recorded on the calendar, according to a prescribed legend, are transcribed monthly or annually to a permanent archive record.

7 Claims, 3 Drawing Sheets

FIG. 1

WOMAN'S CALENDAR FOR LIFE

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| JAN | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| FEB | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | | |
| MAR | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| APR | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | |
| MAY | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| JUN | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | |
| JUL | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| AUG | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| SEP | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | |
| OCT | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| NOV | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | |
| DEC | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

*Important: Notify Your Doctor Of Any Changes*

Mark Suspicious Lumps

M = Menstrual Cycle Day 1  FFD = First Fertile Day   PAP = Pap Smear
BSE = Breast Self Exam    LFD = Last Fertile Day   PHY = Annual Physical
PMS = Premenstrual Syndrome  MAM = Mammogram  O = Other

WOMAN'S CALENDAR

BACKGROUND OF THE INVENTION

This invention relates generally to calendars, particularly to a calendar for use by a woman to record and predict periodic health events.

Prior inventors have developed a wide variety of annual calendars and perpetual calendars intended as records or reminders. Some have been directed to the field of health care. However, none, to my knowledge, has been particularly designed to assist a woman with recording and predicting multiple periodic events such as ovulation, menstruation, premenstrual syndrome (PMS) and to provide reminders for, and records of, other health-related events, such as breast self-examination, mammograms and pap smears.

Health maintenance and disease prevention are every woman's responsibility, as is her responsibility for birth control and conception. The need for women to better understand themselves physically, psychologically and emotionally are important aspects of leading a healthy and productive life.

In 1989 alone, it was predicted that 43,000 women would die in this country of breast cancer, and another 142,900 women (175,000 in 1991) would be newly diagnosed. Studies have shown that only 30% of women regularly perform breast self-examination.

Uterine cancer and endometrial cancer are the cause of about 10,000 deaths per year in this country. In 1989, there were an estimated 13,000 new cases of cervical cancer and 39,000 new cases of endometrial cancer. In the past 40 years, the pap test has reduced the mortality rate for uterine cancer by 70%. Therefore, it is recommended that women should have an annual pap smear from the time they are eighteen years old. Additionally, women over the age of forty should have an annual pelvic exam to rule out ovarian cancer from which, in 1989, there were an estimated 12,000 deaths and 20,000 newly diagnosed cases.

From the foregoing, it is apparent that many deaths, unwanted pregnancies and various health problems can be avoided by a woman's being aware of the chronology of her cyclic events, by conducting periodic self-examination, and by maintaining a detailed health record of periodic events.

SUMMARY OF THE INVENTION

In view of the foregoing, it is an object of this invention to enable and encourage a woman to record her health history and events on a regular basis.

A related object is to enable one to predict various health events from a recorded history of past events.

Another object is to remind a woman to conduct breast self-examinations on a regular basis, and to keep appointments for mammograms, pap smears and annual physicals.

A further object of the invention is to assist health care providers by providing a thorough record of self-observable events and self-examinations kept on a regular basis by a patient.

These and other objects of the invention are met by a twelve month calendar suitable for hanging in the shower area or inside a medicine cabinet, useable by any woman to track her monthly cycles, events or activities having to do with her personal health maintenance (i.e., breast self-exam, mammograms, pap smears, annual physicals), as well as her menstrual cycle, (i.e., the first day of menstrual cycle, periods of fertility, and periods of potential premenstrual syndrome). The calendar is water-proof, and is provided with suitable means for marking the events on the calendar. In addition, the calendar is associated with an archive record containing multiple pages, each similar in appearance to the calendar, so that the calendar markings can be transcribed periodically into the archive record, for example, annually. The shower calendar can then be erased, and re-used indefinitely.

BRIEF DESCRIPTION OF THE DRAWINGS

The accompanying drawings, FIG. 1 is a front elevation of a calendar embodying the invention.

DESCRIPTION OF THE PREFERRED EMBODIMENT

The invention is embodied in a calendar 10 (FIG. 1) having a front surface 12 which is waterproof, markable and erasable. The surface is delineated permanently into an array 14 of rectangles representing the days of the year, organized into twelve rows corresponding to the months of the year. The months are identified alone the left side of the calendar, and the days of the month are identified within the array. Alternatively, the days of the month could be displayed above or below the array, or on a line between the months of June and July. Those days of months with fewer than thirty-one days are shaded out; the 29th day of February may have a lighter shade for marking in a leap year.

Figure 2:
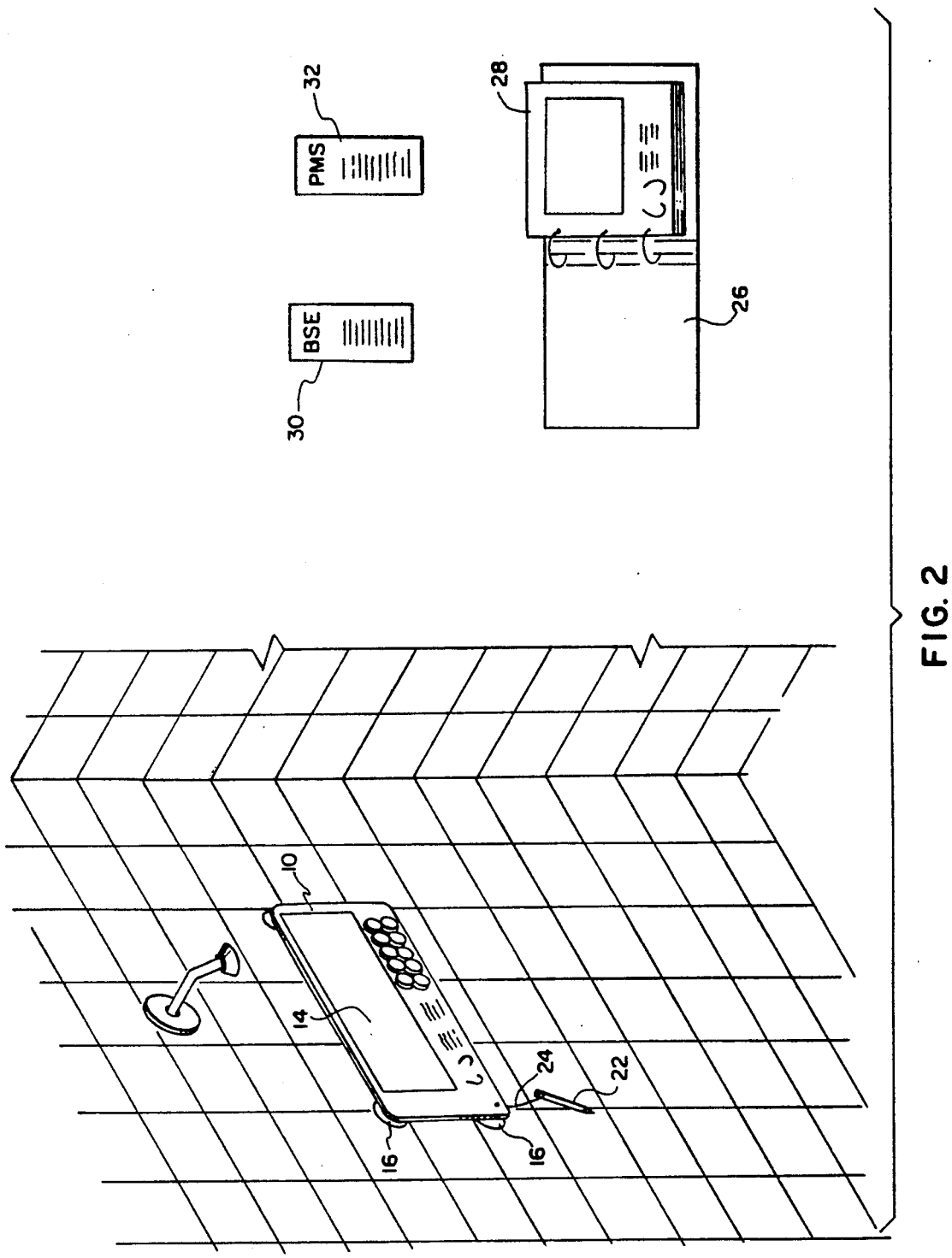
FIG. 2 is a perspective view of a kit or system including the calendar in its intended environment, means for marking on the calendar, and a permanent separate record book or pad containing archive pages.
Figure 3:
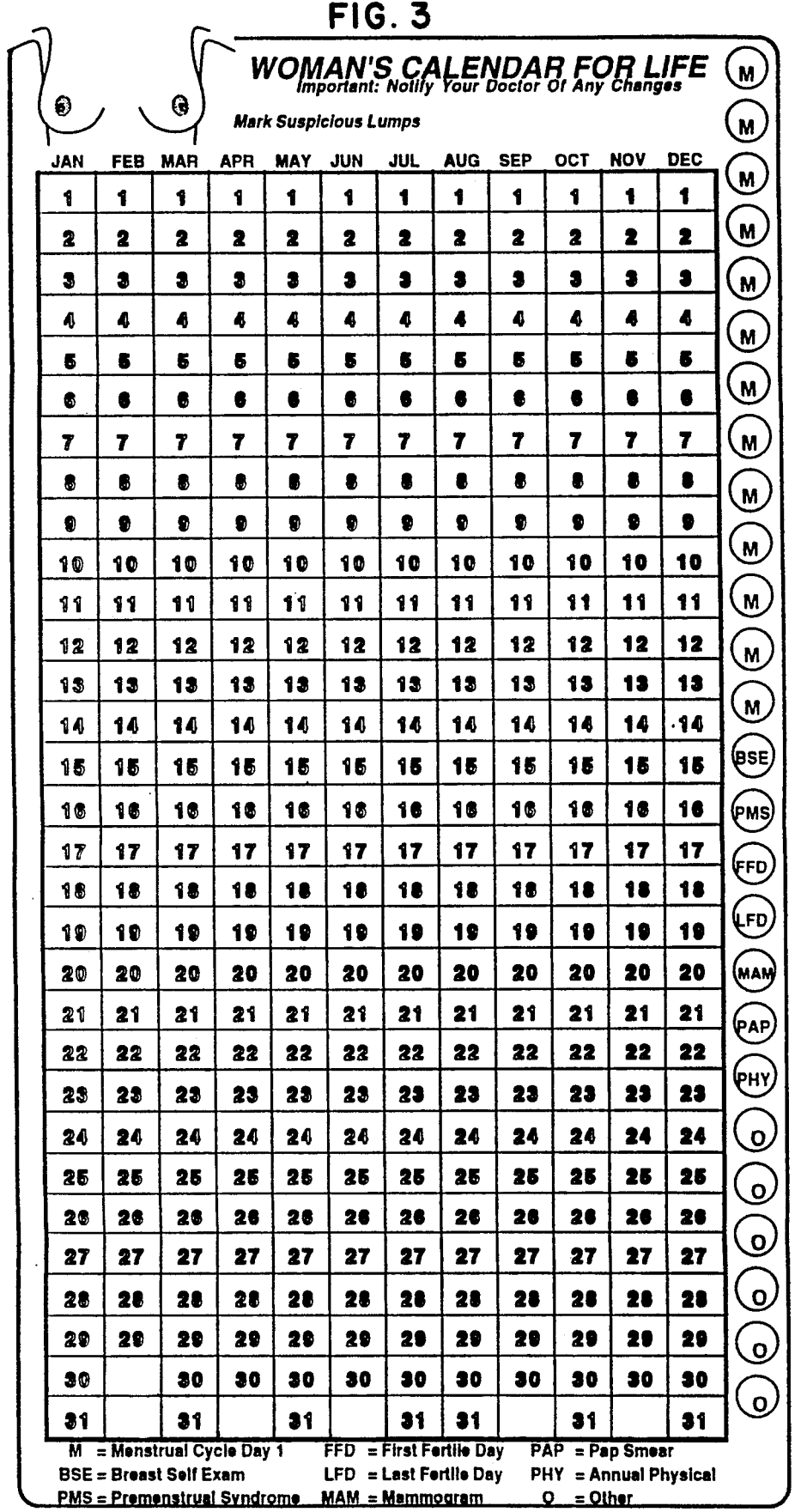
FIG. 3 is a view corresponding to FIG. 1, showing a modified form of the invention.

The best location for the use of this calendar is in the shower area, illustrated in FIG. 2. Since most women spend some time each day in the shower, the calendar is an especially convenient and attractive way of encouraging daily use. To withstand the shower environment, the calendar is made of a waterproof material, for example, plastic, enameled metal, or the like. The calendar may have suction cups 16 or other means on its back side, for attachment to the shower wall.

Underneath the array 14 is a diagram 17 (FIG. 1) of a left and right breast as well as a legend 18 as follows

| | |
|---|---|
| M — Menstrual Cycle Day 1 | MAM — Mammogram |
| BSE — Breast Self Exam | PAP — Pap Smear |
| PMS — Premenstrual Syndrome | PHYS — Annual Physical |
| FFD — First Fertile Day | O — Other |
| LFD — Last Fertile Day | |

The above abbreviations are marked also on magnets 20 that are stored below the legend. A grease pencil 22 (FIG. 2) is also attached to the side or bottom of the calendar, e.g., by a cord 24.

A temporary, twelve month, record can be marked on the calendar by the magnets (identified by color and abbreviations on the legend) and/or by the grease pencil. A permanent record may be created by annually transcribing the shower calendar record to an archive record or "hard copy" of the calendar. The archive record is a pad or bound book 26 (FIG. 2) of smaller—but similarly marked—calendars 28, which will be useful when consulting with one's personal physician or health care provider; the archive copy may also be used when the shower calendar is not available for use and updating, e.g., when traveling.

A suggested method of using the calendar is set out below, under headings corresponding to various events.

Menstrual Cycle

The first day of every menstrual cycle is marked either by a magnet or marked with a grease pencil. For example, if the first day of a menstrual cycle begins on January 6, a magnet or mark by grease pencil (following the legend), is placed on the January 6 box on the calendar indicating the first day, (Day 1) of the menstrual cycle. It is from this point that most other events would be marked, by appropriate legends such as BSE, FFD, LFD, or PMS.

Breast Self-Exam

The BSE magnet or mark may be placed on a day selected by the user, five to seven days after the first day of the menstrual cycle, to visually remind the user to perform BSE on that day, as recommended by the American Cancer Society. Information 30 on how to perform BSE, as recommended by the American Cancer Society, is preferably incorporated into the materials accompanying the calendar. The diagram of the left and right breasts is to be used to mark areas on the breast being monitored by the user between visits to her physician. The user is instructed to report any unusual findings or changes to her physician immediately upon discovery.

Premenstrual Syndrome

To assist the user in better understanding her behavior and/or physical symptoms that previously may have gone unexplained or were cause for personal and/or interpersonal concern, the user may begin to track whether such behavior and/or symptoms are related to PMS. Once the first day of the current menstrual cycle is marked, the projected first day of the next menstrual cycle can also be marked on the calendar. For example, if the user normally has a twenty-eight day menstrual cycle, she can project the first day of her next cycle to be the day after the twenty-eighth day of her current cycle. If her cycle is not regular, then she can project the first day of her next cycle to be anywhere between one day after the shortest or one day after the longest cycle. This is based on the historical evidence already established from previously kept personal menstrual cycle history (or from the already established history exhibited on the calendar after some months of use). If PMS is a problem for the user, the behaviors and symptoms related to PMS would be evident ten to twelve days before the next menstrual cycle is projected to begin. Therefore, the PMS magnet or mark should be placed ten to twelve days before the next anticipated first day of the next menstrual cycle, and the user may or may not be able to relate certain behaviors and or symptoms to PMS. Information 32 describing PMS as well as reference materials related to PMS are incorporated into the materials accompanying the calendar.

Fertility

In order to calculate, identify or predict fertile periods, the user should have at least eight months of good menstrual cycle records. The length (in days) of the longest and the shortest menstrual cycle over each of the previous eight cycles must be identified. Based on an already established and published chart (which is included) the first fertile day (FFD) and last fertile day (LFD) can be determined and marked on the calendar on day one of each menstrual cycle. Depending on the users intent, she, or her significant other, can be aware of when to use or not use birth control, depending upon the outcome desired, i.e., contraception or conception. The O (other) magnet or mark may be used to indicate that intercourse occurred, and will assist in determining conception. Again, reference materials will accompany the calendar.

Other Uses

This calendar can also be used as a reminder to the user of upcoming appointments related to her health. If annual or more frequent mammograms and/or pap smears are recommended, the dates of past and future scheduled appointments can be marked for reference and reminders. This encourages follow-up and health maintenance.

The user may also individualize the calendar by adding to the legend abbreviations for any observations she is following. Blood pressures, weights, basal body temperatures and particular symptoms related to PMS, menstrual cycle and ovulation are some examples of additional items that can be followed and added to the legend.

This calendar serves in a permanent and a perpetual sense. Twelve months of information can be stored on the one calendar in the shower and when it is filled, the upcoming month or the entire year can be transcribed onto the pad or permanent record of the calendar, for both a personal health history and for use by physician. The shower calendar can be erased at this point, so that a new year can be recorded.

Inasmuch as the invention is subject to modifications and variations, it is intended that the foregoing description and the accompanying drawings shall be interpreted as illustrative of only one form of the invention, whose scope is to be measured by the following claims.

I claim:

1. A woman's calendar for use in a shower, comprising
   a sheet of material having a waterproof surface,
   said surface having permanent markings defining an array of rectangles representing all the days of the year,
   a set of movable markers which can be placed on the array, each marker bearing a symbol corresponding to a particular health event, and
   a permanent legend marked on the calendar, the legend showing the correspondence between each of said symbols and said health events,
   wherein said sheet has a ferromagnetic component, and said markers are magnetic.

2. The invention of claim 1, further comprising an archive record comprising a plurality of bound pages, each marked similarly to the shower calendar sheet, to which events that have been recorded on the shower calendar can be transcribed, whereby a series of annual health records can be maintained, and the shower calendar re-used.

3. The invention of claim 2, further comprising reference materials explaining breast self-examination, premenstrual syndrome, and determination of periods of fertility.

4. The invention of claim 1, further comprising means for connecting the sheet to a shower stall.

5. The invention of claim 4, wherein said connecting means comprises at least one suction cup.

6. The invention of claim 1, wherein the front surface of the sheet is of a material which can be marked upon, and further comprising a writing implement for making erasable, waterproof marks on the calendar and means for connecting the writing implement to the calendar.

7. The invention of claim 6, wherein the calendar sheet is further marked with a breast diagram, upon which results of breast self-examination can be marked with the writing implement.

* * * * *